United States Patent [19]

Sugino

[11] 4,453,924
[45] Jun. 12, 1984

[54] FRONT GEAR FOR BICYCLES

[75] Inventor: Yasushi Sugino, Ikoma, Japan

[73] Assignee: Sugino Cycle Industries, Ltd., Osaka, Japan

[21] Appl. No.: 361,763

[22] Filed: Mar. 25, 1982

[30] Foreign Application Priority Data

Mar. 30, 1981 [JP] Japan ................. 56-46136[U]

[51] Int. Cl.³ .......................................... F16H 55/30
[52] U.S. Cl. ................................ 474/160; 474/161; 474/902; 474/903
[58] Field of Search ............... 74/439, DIG. 10, 447; 474/902, 903, 160, 161, 162, 158

[56] References Cited

U.S. PATENT DOCUMENTS

| 2,720,119 | 10/1955 | Sherman | 474/161 |
| 3,059,491 | 10/1962 | Hoff et al. | 474/161 |
| 3,168,836 | 2/1965 | Militana | 474/902 |
| 3,272,027 | 9/1966 | Wayman | 474/161 |
| 3,469,466 | 9/1969 | Heathwaite et al. | 74/439 |
| 3,469,467 | 9/1969 | Seaman | 74/439 |
| 3,541,873 | 11/1970 | Wolf et al. | 474/161 |
| 3,606,497 | 9/1971 | Gilles | 474/161 |
| 3,666,322 | 5/1972 | Pickron | 474/161 |
| 4,007,621 | 3/1977 | Segawa | 474/160 |
| 4,106,357 | 8/1978 | Segawa | 474/160 |

FOREIGN PATENT DOCUMENTS 55-26031 7/1980 Japan .

Primary Examiner—Lawrence J. Staab
Assistant Examiner—Michael D. Bednarek
Attorney, Agent, or Firm—Koda and Androlia

[57] ABSTRACT

A front gear for bicycles comprising a gear main body made of plastics and a metal core embedded in the gear main body. The metal core includes ribs embedded in support arms of the gear main body and a boss having a serrated bore for a crankshaft to fit in and embedded, at its outer peripheral portion other than the inner peripheral portion thereof, in an inner annular portion of the gear main body. One of the support arms has an opening in register with a positioning hole formed in one of the core ribs.

5 Claims, 5 Drawing Figures

FRONT GEAR FOR BICYCLES

BACKGROUND OF THE INVENTION

The present invention relates to a front gear for bicycles, and more particularly to a front gear or sprocket wheel for driving a chain for driving the rear wheel of a bicycle.

Conventional front gears for bicycles comprise a support member including a boss formed with a crankshaft bore and support arms extending radially from the boss, and an annular member formed with sprockets along its outer periphery. The support member and the annular member are made of metal. For assembling, the annular member is fastened to the support arms of the support member by bolts and nuts or by rivets, so that the procedure is cumbersome and costly. Further since the gear is made of metal in its entirety, it is difficult to color the gear variously for decoration.

It appears that the front gear can be produced at a lower cost and can be colored as desired if it is molded entirely from plastics, but in this case, the boss to which a crankshaft is to be attached is low in strength. Furthermore the support arms will not have sufficient strength to support the annular member having the sprockets. Thus the gear is unfit for use.

We thought it possible to overcome this problem by making the boss from metal and molding the annular sprocket portion and the support arms therefor integrally from plastics. In this case, however, the boss will not be joined to the support arms firmly but is likely to separate therefrom. Further when the metal boss is inserted in an arm mold and the support arms are formed from plastics as connected to the arms by injection molding, the sprocket portion formed will not be concentric with the boss if the boss is displaced from the specified position within the mold even slightly.

SUMMARY OF THE INVENTION

An object of the present invention is to provide a front gear for bicycles which comprises an outer annular portion having sprockets and support arms for supporting the annular portion, the annular portion and the support arms being integrally molded from plastics, a metal core having a boss and being embedded in the support arms. The plastics molding can be colored as desired to produce an improved decorative effect. The boss is made of metal for a crankshaft to fit in to support the crank with high strength. The support arms are formed by injection molding as joined to the metal core with use of an arm mold in which the core is inserted. Thus the front gear can be manufactured with ease inexpensively.

Another object of the invention is to provide a front gear of the type described wherein the support arms are arranged radially and have radially inner base ends which are connected together by an inner annular portion, the metal core being integral with ribs extending radially from the boss in corresponding relation to the support arms, the ribs being embedded in the support arms, the boss being embedded in the inner annular portion at the outer peripheral portion of the boss except at the inner peripheral portion thereof. Since the ribs of the metal core are embedded in the support arms with the outer peripheral boss portion also embedded in the inner annular portion, the metal core is firmly joined to the gear main body of plastics. Although the inner peripheral edge portion of the boss is exposed without being embedded in the inner annular portion, a crank, when attached to the boss, covers the edge portion, rendering this portion invisible.

Another object of the invention is to provide a front gear of the type described wherein at least one of the ribs of the metal core is formed with a positioning hole, and the support arm having the rib embedded therein has an opening in register with the hole. When the metal core is inserted into a mold for forming the gear main body, a core formed in the mold is inserted through the crankshaft bore of the boss of the metal core, whereby the sprocket wheel to be formed can be positioned concentrically with the metal core boss without any eccentricity. Further a positioning pin formed in the mold is inserted through the positioning hole of the metal core rib. When the molding is released from the mold, the above-mentioned opening is formed in one of the support arms in corresponding relation to the pin. Accordingly the engagement of the pin in the positioning hole positions the gear main body to be formed and the metal core properly relative to each other with respect to the circumferential direction. When the crankshaft which is serrated is installed in the core boss of the completed front gear, this assures that the crank will be positioned properly relative to the gear main body circumferentially thereof.

Another object of the invention is to provide a front gear of the type described wherein a hole is formed in each of the metal core ribs, and the hole of at least one of the ribs serves as the positioning hole, the holes in the other ribs serving as connecting holes and being filled with the plastics forming the support arms and enclosing the ribs, whereby the metal core is firmly joined to the gear main body.

Still another object of the invention is to provide a multistep front gear for bicycles comprising an outer annular portion serving as a chain guard, a large sprocket wheel and a small sprocket wheel which are arranged in succession axially thereof as spaced apart from one another and which are molded integrally as a gear main body. When the gear main body is thus molded integrally from plastics, sprocket wheels of desired varying diameters can be formed easily to provide a multistep gear.

BRIEF DESCRIPTION OF THE DRAWINGS

FIG. 4 (B) is an enlarged sectional view showing a crankshaft.

DESCRIPTION OF THE PREFERRED EMBODIMENT

Figure 1:
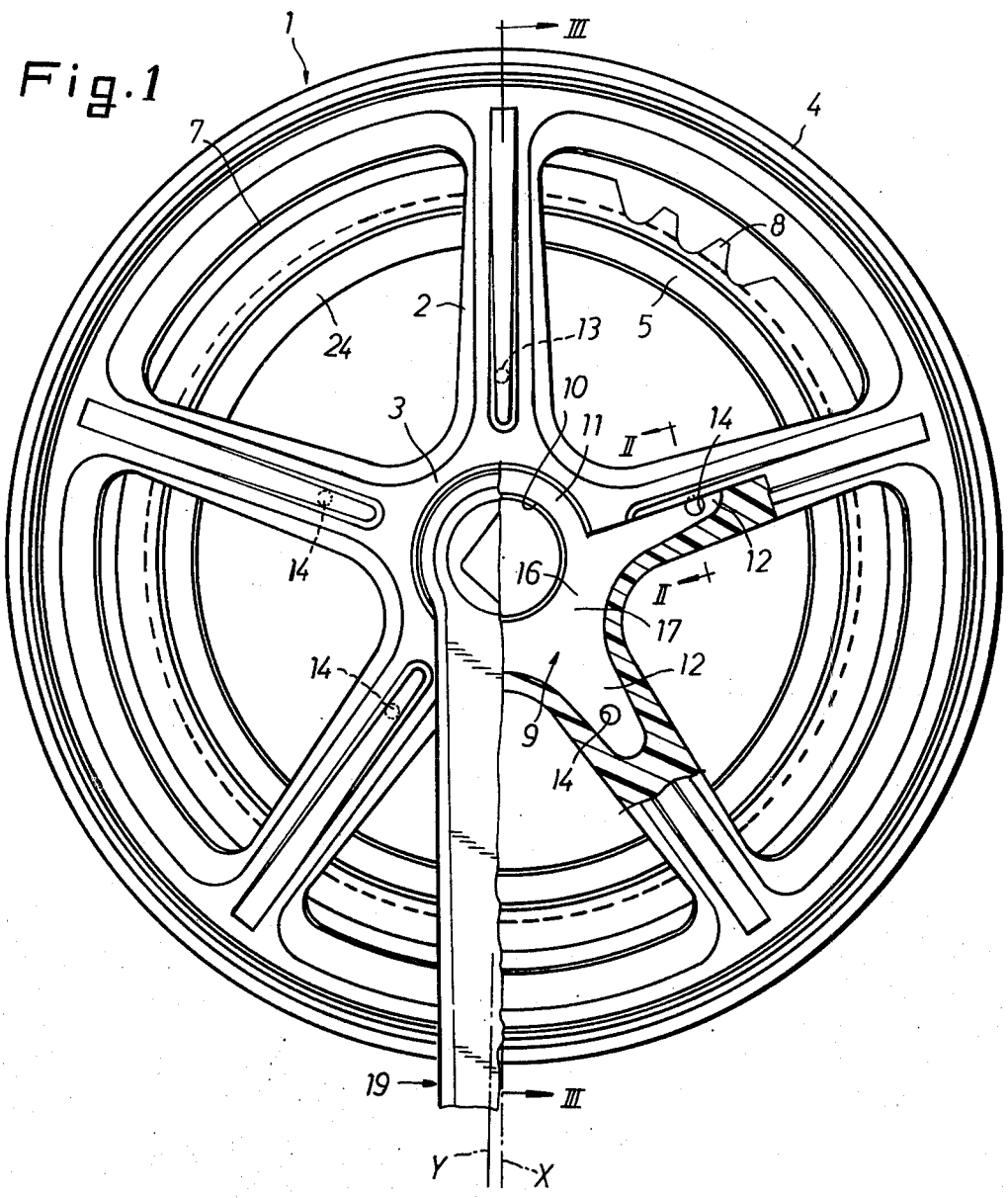
FIG. 1 is a front view partly broken away and showing an embodiment of the invention.
Figure 3:
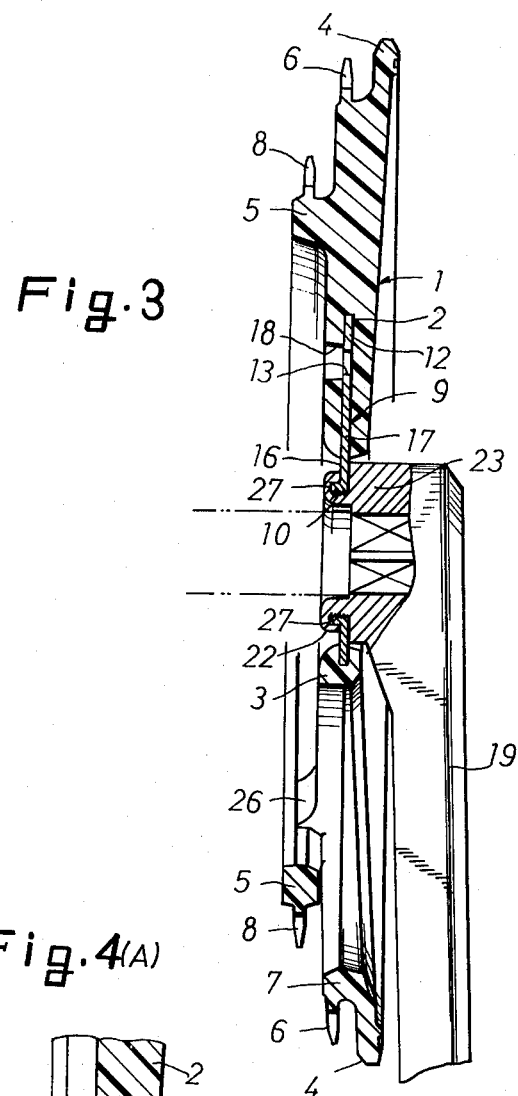
FIG. 3 is a view in section taken along the line III—III in FIG. 1.

With reference to FIGS. 1 and 3, a front gear for bicycles comprises a gear main body 1 made of plastics and a metal core 9 embedded in the gear main body.

The gear main body 1 comprises a plurality of support arms 2 arranged radially of the axis of the body 1, an inner annular portion 3 connecting together the base ends of the arms 2 which ends are positioned radially inwardly of the main body 1, an outer annular portion 4 connecting together the other ends of the arms 2 which ends are positioned radially outward of the main body 1, and an intermediate annular portion 5 positioned between the inner and outer annular portions 3, 4 and connecting the arms 2 together. These arms 2 and the portions 3 to 5 are integrally molded from plastics, such as nylon resin. A large sprocket wheel 6 is arranged in parallel with the outer annular portion 4 as axially spaced apart therefrom, and the sprocket wheel 6 and the outer annular portion 4 are connected together at the inner periphery of the outer annular portion 4 by a portion 7 of U-shaped section. The U-shaped portion 7 is formed substantially over the entire inner periphery of the wheel 6. A small sprocket wheel 8 is formed on the outer periphery of the intermediate annular portion 5. The portion 5 is projected from one side of the support arms 2 to provide a spacing between the arms 2 and the small sprocket wheel 8. Accordingly the outer annular portion 4, the large sprocket wheel 6 and the small sprocket wheel 8 are arranged in succession as spaced apart from one another axially of the gear main body 1 and are included in the integral molding of the gear main body 1. The main body is colored as desired by admixing a pigment with the plastics material and/or by applying a coating composition to the molding.

Figure 4A:
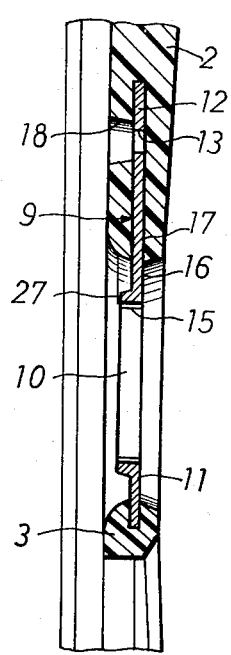
FIG. 4 (A) is an enlarged sectional view showing a metal core.
Figure 4B:
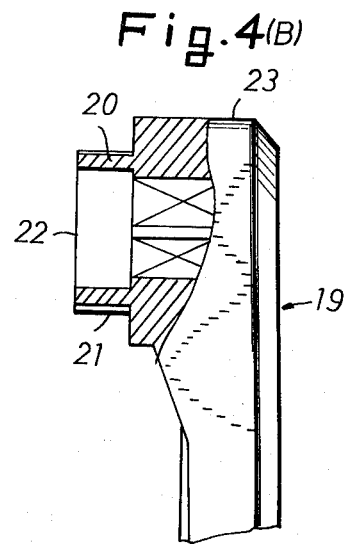

The metal core 9 is formed by stamping a metal plate and includes a boss 11 having a crankshaft bore 10 and ribs 12 integral with the boss 11 and extending radially from the boss in corresponding relation to the support arms 2. Each of the ribs 12 is formed with a hole. The hole of at least one of the ribs serves as a positioning hole 13, and the holes of the other ribs serve as connecting holes 14. The crankshaft bore 10 is formed with serrations 15 as seen in FIG. 4 (A).

Figure 2:
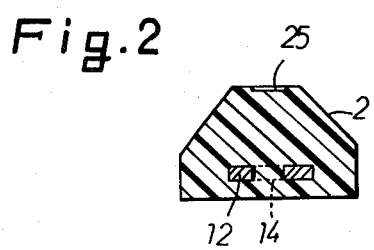
FIG. 2 is an enlarged view in section taken along the line II—II in FIG. 1.

The ribs 12 are embedded in the support arms 2 of the main body 1. The boss 11 is embedded, at its outer peripheral portion 17 other than the inner peripheral edge portion 16 thereof, in the inner annular portion 3 of the gear main body 1. One of the support arms 2 is formed with an opening 18 in register with the positioning hole 13, while the connecting holes 14 are filled with the plastics forming the support arms 2 as shown in FIG. 2.

To embed the metal core 9 in the gear main body 1, the core 9 is inserted into an unillustrated mold when the main body 1 is to be molded. A core of the mold is inserted through the crankshaft bore 10 of the metal core 9, and a positioning pin in the mold is inserted through the positioning hole 13. After the core 9 has been placed concentrically with the gear main body to be formed as positioned properly circumferentially thereof, the mold is closed, and the main body 1 is formed by injection molding. When the molding is released from the mold, one of the support arms 2 has the opening 18 formed in corresponding relation to the pin in the mold.

A crank 19 is attached to the front gear having the metal core 9 embedded in the gear main body 1. As shown in FIG. 4 (B), the crankshaft 20 is externally formed with serrations 21 fittable to the serrations 15 in the bore 10. The crank is provided with an unillustrated pedal at its forward end. The crankshaft 20 is inserted into the bore 10 of the metal core 9 and crimped at its end 22 to the inner peripheral edge portion 16 of the boss 11. The other side of the edge portion 16 is covered with the base portion 23 of the crank 19. By the engagement between the serrations 15 and 21, the crank 19 is attached to the boss 11 properly in alignment with a predetermined line X as seen in FIG. 1. The crank 19 must be installed in place accurately in alignment with the predetermined line X, relative to a marking 24 of letters, pattern or the like which is made on the gear main body 1 by molding or hot stamping. According to the present invention, the metal core 9 is inserted into the mold as positioned properly by the crankshaft bore 10 and the hole 13 as already described, whereby the metal core 9 is joined to the gear main body 1 and positioned accurately relative to the body 1 circumferentially thereof. Consequently the crank 19, when attached to the gear by the engagement of the serrations 21 with the serrations 15, is in alignment with the predetermined line X accurately without any likelihood of being aligned with an undesired line Y shown in FIG. 1.

The drawings further show grooves 25 formed in the surfaces of the support arms 2, portions 26 for reinforcing the junctions of the intermediate annular portion 5 and the support arms 2, and a projection 27 formed on the boss 11 around the crankshaft bore 10.

What is claimed is:

1. A front gear for a bicycle comprising a gear main body made of plastics and a metal core embedded in the gear main body; the gear main body being in the form of an integral molding of plastics including a plurality of support arms arranged radially of the axis of the main body, an inner annular portion connecting together radially inward base ends of the support arms, an outer annular portion connecting together radially outward ends of the support arms and a sprocket wheel formed at the outer annular portion, the sprocket wheel and the outer annular portion being integrally joined together at an inner periphery of the outer annular portion and being arranged in succession axially thereof as spaced apart from one another so that the outer annular portion serves as a chain guard; the metal core including a boss having a serrated bore for a crankshaft to fit in and ribs integral with the boss and extending radially from the boss in corresponding relation to the support arms, each extended end of the ribs terminating at an intermediate portion of the support arms, at least one of the ribs being formed with a positioning hole, the ribs being embedded in the support arms of the gear main body, the boss being embedded in the inner annular portion of the gear main body at only an outer peripheral portion of the boss, while an inner peripheral portion of the boss being exposed to which an end of the metal crank shaft is to be crimped after insertion into the boss; at least one of the support arms being formed with an opening and register with the positioning hole.

2. A front gear as defined in claim 1 wherein a hole is formed in each of the ribs of the metal core, and the hole of at least one of the ribs serves as the positioning hole, the holes in the other ribs serving as connecting holes and being filled with support arm forming plastics.

3. A front gear as defined in claim 1 or 2 wherein the sprocket wheel is arranged in parallel with the outer annular portion as axially spaced apart therefrom, and the sprocket wheel and the outer annular portion are integrally joined together at an inner periphery of the outer annular portion.

4. A multistep front gear for a bicycle comprising a gear main body made of plastics and a metal core embedded in the gear main body; the gear main body being in the form of an integral molding of plastics including a plurality of support arms arranged radially of the axis of the main body, an inner annular portion connecting together radially inward base ends of the support arms, an outer annular portion connecting together radially outward ends of the support arms, an intermediate annular portion positioned between the inner and outer annular portions and connecting the arms together, a large sprocket wheel provided in parallel with the outer annular portion on one side thereof and a small sprocket wheel provided on the outer periphery of the intermediate annular portion, the outer annular portion, the large sprocket wheel and the small sprocket wheel being arranged in succession axially thereof as spaced apart from one another, the large sprocket wheel and the outer annular portion being integrally joined together at an inner periphery of the outer annular portion and the outer annular portion serves as a chain guard; the metal core including a boss having a serrated bore for a crankshaft to fit in and ribs integral with the boss and extending radially from the boss in corresponding relation to the support arms, each extended end of the ribs terminating at an intermediate portion of the support arms, at least one of the ribs being formed with a positioning hole, the ribs being embedded in the support arms of the main body, the boss being embedded in the inner annular portion of the gear main body at only an outer peripheral portion of the boss, while an inner peripheral portion of the boss being exposed to which an end of the metal crank shaft is to be crimped after being inserted into the boss; at least one of the support arms being formed with an opening register with the positioning hole.

5. A multistep front gear as defined in claim 4 wherein a hole is formed in each of the ribs of the metal core, and the hole of at least one of the ribs serves as the positioning hole, the holes in the other ribs serving as connecting holes and being filled with support arm forming plastics.

* * * * *